3,591,625
ESTERIFICATION OF TEREPHTHALIC ACID WITH AN ALKYLENE GLYCOL IN THE PRESENCE OF UREA OR AN ALKYL UREA
Ian C. Twilley and Stanley D. Lazarus, Petersburg, Va., assignors to Allied Chemical Corporation, New York, N.Y.
No Drawing. Filed June 17, 1968, Ser. No. 737,311
Int. Cl. C07c 69/82
U.S. Cl. 260—475PR                                    13 Claims

ABSTRACT OF THE DISCLOSURE

A process for the direct esterification of terephthalic acid with an alkylene glycol which comprises esterifying terephthalic acid with an alkylene glycol containing 2 to about 10 carbon atoms per molecule under direct esterification conditions in the presence of an amount of urea or an alkyl urea sufficient to suppress the formation of aliphatic ether groups.

BACKGROUND OF THE INVENTION

This invention relates to a process for the preparation of linear, high-molecular weight polyesters having improved properties and more specifically to a process for preparing, by direct esterification and subsequent polymerization, high-molecular weight polyalkylene terephthalates and copolymers thereof using urea or an alkyl urea as a suppressant in the esterification reaction to suppress the formation of undesirable aliphatic ether groups.

While there are a number of known processes for the direct esterification of terephthalic acid and its subsequent polymerization to polyalkylene terephthalate, there is still a need for a process capable of producing high melting polyesters while at the same time minimizing undesirable concurrent reactions such as the formation of aliphatic ether groups which causes the resulting polymer to be subjected to thermal degradation. The problem of ether formation and thermal degradation of the resin is particularly important when the polyesters are to be used as fibers for industrial applications such as, for example, tire yarn.

Reaction conditions usually used in direct esterification reactions such as high alkylene glycol to terephthalic acid ratios and high temperatures also favor side reactions which produce undesirable effects on the polymer including those due to the formation of aliphatic ether groups. These aliphatic ether groups, even though present in small amounts, are undesirable since they become a part of the final polymer chain thereby causing shaped structures produced therefrom to exhibit poor thermal stability, poor ultraviolet light stability, poor hydrolytic stability, poor hot-wet (wash and wear) properties, and accelerated dye fading. If these aliphatic ether units exceed ten mole percent of the polymer, the polymer is generally not suitable for fiber or film production.

SUMMARY OF THE INVENTION

It has been found that improved high-molecular weight, linear polyalkylene terephthalates, for example, polyethylene terephthalate, can be prepared which contain a substantially reduced amount of aliphatic ether groups and which are therefore eminently useful for the preparation of fibers and films suitable for textile and industrial applications. These polymers are obtained by esterifying terephthalic acid with an alkylene glycol in the presence of an amount of urea or an alkyl urea sufficient to suppress the formation of aliphatic ether groups and subsequently condensing the diglycol terephthalate ester and low polymers thereof produced to polyalkylene terephthalate in the presence of a suitable poly-condensation catalyst. In accordance with the present invention, linear, high-molecular weight polyalkylene terephthalates containing a reduced amount of aliphatic ether groups are prepared by a process which comprises reacting, under direct esterification conditions, terephthalic acid with, an alkylene glycol containing from 2 to about 10 carbon atoms per molecule in the presence of an amount of urea or an alkyl urea sufficient to suppress the formation of aliphatic ether groups. The diglycol terephthalate ester and low polymers thereof produced can then be condensed to polyalkylene terephthalate in the presence of a suitable polycondensation catalyst. The ortho- or meta-isomers of phthalic acid and/or a modified phthalic acid, such as the sulfonated isomers of phthalic acid, may be added to terephthalic acid in small amounts and be esterified along with it to change the characteristics of the final polymer depending upon its ultimate use. In addition to the isomers of phthalic acid and modified phthalic acids, it is obvious that other modified compounds such as 2,5 naphthalene dicarboxylic acid, 4,4' dicarboxydiphenyl sulfone, diphenylene phenylene diamine, and/or tricresyl phosphate may also be added to the terephthalic acid in small amounts to change the characteristics of the final polymer depending upon its ultimate use. For example, diphenylene phenylene diamine may be added to improve fatigue resistance. For convenience in the remainder of the specification and in the claims, when the term terephthalic acid is used alone, it is to be understood that the other isomers of phthalic acid, isomers of modified phthalic acids, and the other modified compounds as described above can be present in the reaction mixture.

The polyalkylene terephthalate polymers may be prepared by esterifying terephthalic acid with one or more alkylene glycols having 2 to about 10 carbon atoms per molecule in the manner described above. Suitable alkylene glycols include, for example, ethylene glycol, propylene glycol, butylene glycol, trimethylene glycol, tetramethylene glycol, hexamethylene glycol, heptamethylene glycol, decamethylene glycol, and mixtures thereof. It is preferred to use the lower molecular weight alkylene glycols which contain 2 to about 4 carbon atoms since they produce highly polymerized esters having high melting points.

In esterifying the terephthalic acid, the alkylene glycol is present during the direct esterification in amounts ranging from about 1 to 3, preferably about 1.5 to 1.7 moles of alkylene glycol per mole of terephthalic acid. The direct esterification of the alkylene glycol and the terephthalic acid may start as low as about 200° C. and range up to about 300° C., preferably from about 250° C. to 280° C., either at atmospheric pressure or at pressures ranging up to about 300 p.s.i.g. but more preferably at pressures ranging from about 70 to 250 p.s.i.g. for periods from about ¼ to about 4 hours until the reaction is substantially completed. After the terephthalic acid is esterified with the glycol, the water formed during the reaction, the ether suppressant and excess glycol can be removed by reducing the pressure to atmospheric thereby leaving a substantially pure esterified prepolymer.

The polymerization or condensation of the diglycol terephthalate ester prepolymer is then carried out at temperatures ranging from about 260° C. to 310° C., preferably about 270° C. to 290° C., under reduced pressure which can be as low as 0.01 mm. of mercury. The condensation may be carried out under these conditions for periods ranging from about 1 to 7, preferably about 2 to 6, hours until a polymerization product of the requisite molecular weight, as determined by viscosity or other convenient physical measurement is obtained. The duration of the condensation will depend obviously upon polymerization conditions, e.g., batch or continuous process, surface generation provisions, temperature and pressure profiles. In a continuous polymerization process, for example, the polymerizing mass can be agitated continuously to give maximum exposure to the vacuum which helps to remove the glycol as rapidly as possible. The condensation polymerization is preferably carried out under sub-atmospheric pressures and preferably in an inert atmosphere, e.g., nitrogen, or in the absence of oxygen or oxygen-containing gases.

As indicated, the direct esterification may take place at super atmospheric pressure with temperatures ranging up to about 300° C. for periods ranging up to about 4 hours while the condensation reaction may take place over periods ranging from about 1 to 7 hours. The actual reaction times, however, will obviously vary depending upon the concentration of catalysts, reaction temperatures, reaction pressure, and the molecular weight desired of the final polymer.

In the course of polymerization, other ingredients may be added for obtaining special properties in the polyester product. These ingredients include flame retardants, delustrants, antistatic agents, adhesion promoting agents, heat and light stabilizers, pigments, dyestuff precursors and assistants, fluorescent agents and brighteners, non-reactive and heterogeneous polymers, cross-linking agents, bacteriostats, and the like.

In preparing the linear, high-molecular weight polyalkylene terephthalates contemplated by this invention, it is desirable to use urea or an alkyl urea in the direct esterification reaction in amounts ranging from about 0.005 to 1.0, preferably about 0.04 to 0.7, weight percent based on the weight of the terephthalic acid used in the direct esterification reaction. The alkyl urea is an alkyl urea of the general Formulas (I) or (II):

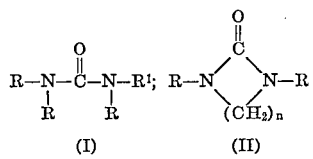

wherein $R^1$ is lower alkyl containing up to about 6 carbon atoms, R is hydrogen or lower alkyl containing up to about 6 carbon atoms and $n$ is an integer of about 2 to 10, preferably about 2 to 8. Suitable alkyl ureas include 1-methyl urea, 1-ethyl urea, 1,3- and 1,1-dimethyl urea, 1,3- and 1,1-diethyl urea, 1,1,3-trimethyl urea, 1,1,3,3-tetramethyl urea, 2-imidazolidinone (ethylene urea), etc. The presence of urea or an alkyl urea in the direct esterification reaction suppresses the formation of aliphatic ether groups which can become part of the final polymer chain thereby causing shaped structures produced therefrom to exhibit poor physical and chemical properties, e.g., poor thermal stability. The urea or alkyl urea is added to the terephthalic acid-alkylene glycol reaction mixture prior to esterification. Superior results are obtained when the urea or alkyl urea is homogenized with the reactant glycol and acid. When less than 0.005 weight percent of urea or alkyl urea per weight of terephthalic acid initially present is employed, its effect is generally not sufficient to suppress the formation of aliphatic ether groups. On the other hand, when more than 1.0 weight percent of urea or alkyl urea is employed, undesirable discoloration in the final polymer can result.

The use of urea or an alkyl urea in the direct esterification as described above produces terephthalate ester prepolymer suitable for condensation or polymerization to a fiber or film-forming polymer. The polyalkylene terephthalate is condensed in the manner described above in the presence of a suitable polycondensation catalyst which can be a compound of antimony such as antimony trioxide or antimony oxalate but preferably an antimony salt of one of the higher fatty acids or a mixture of such acids such as the salt of the complex acid mixture of tall oil. The tall oil acids used in preparing such antimony salts are commercially available and may be characterized as comprising (1) rosin acids including abietic, neoabietic, dehydroabietic, levopimaric, palustric, pimaric and isopimaric acids; (2) saturated fatty acids including stearic, palmitic and lauric acids, etc.; (3) unsaturated fatty acids, mainly oleic and linoleic, with a small amount of linolenic; and (4) unsaponifiables, mainly hydrocarbons such as various terpenes, alcohols and sterols. The tall oil acids may be refined or unrefined, however, the preferred tall oil acids are the highly refined or double-fractionated tall oil acid mixtures comprising about 1 percent of the rosin acids, about 96.8 percent of the fatty acids, e.g., about 46 percent linoleic acid, about 48 percent oleic acid and about 2.8 percent saturated fatty acids, and about 2.2 percent of the unsaponifiables. A particularly preferred antimony compound is antimony tris-tallate. These preferred catalysts, e.g., antimony salts of tall oil, may be further characterized as being volatile to the extent of at least 15 percent during the polymerization when exposed, for example, to a vacuum of about 0.3 to 0.6 mm. of Hg at temperatures of about 275 to 280° C. The antimony salt of a tall oil acid can be prepared by heating antimony trioxide, for example, at reflux temperatures with agitation until all of the acid is neutralized, as indicated by the acid number of the final product.

It has been found that although polymerization catalysts such as the antimony compounds named above have little or no effect in promoting the direct esterification reaction between terephthalic acid and ethylene glycol, they likewise have no deleterious effect on the esterification reaction and, therefore, may be added with the urea or alkyl urea to the reaction mixture prior to commencement of the direct esterification reaction.

PREFERRED EMBODIMENTS

The following examples illustrate the practice and principles of this invention and a mode of carrying out the invention.

Example 1

A 5 gallon stainless steel autoclave fitted with a double spiral agitator, a condenser, jacketed and provided with electrically heated Dowtherm, was charged with 10 pounds of Mobil A-900 terephthalic acid, 7.5 pounds of Allied Chemical DX-HP grade ethylene glycol, 0.01 pound of urea and 0.025 pound of antimony tris-tallate. The autoclave was purged with nitrogen, sealed and heated with Dowtherm at a temperature of 280° C. The agitator was set at 30 r.p.m. A relief valve on the condenser was set at 70 p.s.i.g. When the temperature reached about 240° C., a mixture of water and ethylene glycol distilled over and was collected, weighed and measured for percent water by refractive index. As the reaction approached completion, the temperature of the reactants started to rise and the esterification reaction was completed when the temperature of the reactants reached 255° C. The pressure was gradually released from the autoclave during the next 45 minutes and the temperature of the esterified product rose to 270° C. as the pressure was reduced to atmospheric. Water formed during the esterification reaction, the residual ether suppressant and excess glycol were removed from the esterified product by flashing as the pressure was reduced to atmospheric.

A vacuum pump was then attached to the condenser and the Dowtherm temperature was increased to 290° C. A vacuum was applied when the reactant temperature reached 275° C. A vacuum of 0.2 mm. Hg was attained in about 30 minutes and was maintained during the polymerization. When a steady vacuum was attained, the speed of the agitator was reduced to 15 r.p.m. Polymerization was continued for 5 hours and was accompanied by an increase of power required to maintain constant agitator speed. Purified nitrogen was then admitted to the autoclave and a pressure of 20 p.s.i.g. was maintained while the polymer was extruded through a valve at the bottom of the autoclave into a quench trough filled with water. The extruded polymer was then fed onto a takeup reel. The polymer strand was subsequently pelletized using a Wiley Mill. The polymer had an intrinsic viscosity of 0.96 measured at a concentration of 0.5 gram per deciliter in a 60:40 by weight mixture of phenol and symmetrical tetrachloroethane. Other important polymer properties were:

COOH end groups: 25 microequivalents/gm.
DTA melting point: 253° C.
Diethylene glycol content: 2.29 mole percent Example 2

The 5 gallon stainless steel autoclave used in Example 1 was charged with 10 pounds of Mobil A–900 terephthalic acid, 7.5 pounds of Allied Chemical DX-HP grade ethylene glycol, 0.01 pound of 1-methyl urea and 0.025 pound of antimony tris-tallate. The esterification and polymerization reactions were conducted in the same manner as described in Example 1. The polymer had an intrinsic viscosity of 0.92 measured at a concentration of 0.5 gram per deciliter in a 60:40 by weight mixture of phenol and symmetrical tetrachlorethane. Other important polymer properties were:

COOH end groups: 20 microequivalents/gm.
DTA melting point: 255° C.
Diethylene glycol content: 1.53 mole percent Example 3

The 5 gallon stainless steel autoclave used in Example 1 was charged with 10 pounds of Mobil A–900 terephthalic acid, 7.5 pounds of Allied Chemical DX-HP grade ethylene glycol, 0.01 pound of 1-ethyl urea and 0.025 pound of antimony tris-tallate. The esterification and polymerization reactions were conducted in the same manner as described in Example 1. The polymer had an intrinsic viscosity of 0.84 measured at a concentration of 0.5 gram per deciliter in a 60:40 by weight mixture of phenol and symmetrical tetrachloroethane. Other important polymer properties were:

COOH end groups: 10 microequivalents/gm.
DTA melting point: 256° C.
Diethylene glycol content: 1.52 mole percent Example 4

The 5 gallon stainless steel autoclave used in Example 1 was charged with 10 pounds of Mobil A–900 terephthalic acid, 7.5 pounds of Allied Chemical DX-HP grade ethylene glycol, 0.01 pound of 2-imidazolidinone (ethylene urea) and 0.025 pound of antimony tris-tallate. The esterification and polymerization reactions were conducted in the same manner as described in Example 1. The polymer had an intrinsic viscosity of 0.94 measured at a concentration of 0.5 gram per deciliter in a 60:40 by weight mixture of phenol and symmetrical tetrachloroethane. Other important polymer properties were:

COOH end groups: 27 microequivalents/gm.
DTA melting point: 253° C.
Diethylene glycol content: 2.15 mole percent Example 5

The 5 gallon stainless steel autoclave used in Example 1 was charged with 10 pounds of Mobil A–900 terephthalic acid, 7.5 pounds of Allied Chemical DX-HP grade ethylene glycol and 0.025 pound of antimony tris-tallate. No urea or alkyl urea was charged to the autoclave in this run. The esterification and polymerization reactions were conducted in the same manner as described in Example 1. The polymer had an intrinsic viscosity of 0.83 measured at a concentration of 0.5 gram per deciliter in a 60:40 by weight mixture of phenol and symmertical tetrachloroethane. Other important polymer properties were:

COOH end groups: 29 microequivalents/gm.
DTA melting point: 246° C.
Diethylene glycol content: 5.7 mole percent A comparison of the polymers produced in Examples 1 through 5 shows that the polymers of Examples 1 through 4, where urea, 1-methyl- and 1-ethyl urea and 2-imidazolidinone were used, respectively, had diethylene glycol contents of only 2.29, 1,53, 2.15 and 1.52 mole percents, respectively, whereas the polymer of Example 5, produced without urea or an alkyl urea, had a diethylene glycol content of 5.7. The polymers produced in Examples 1 through 4 also had higher DTA melting points. These data show that either urea or an alkyl urea is effective in suppressing the formation of aliphatic ether groups.

It is claimed:
1. A process for the direct esterification of terephthalic acid with an alkylene glycol which comprises esterifying terephthalic acid with an alkylene glycol containing 2 to about 10 carbon atoms per molecule under direct esterification conditions in the presence of an amount of urea sufficient to suppress the formation of aliphatic ether groups.

2. The process of claim 1 wherein the direct esterification is conducted at temperatures ranging from about 200 to 300° C. and pressures ranging from atmospheric up to about 300 p.s.i.g.

3. The process of claim 2 wherein the urea is present in the amount of about 0.005 to 1.0 weight percent based upon the weight of the terephthalic acid.

4. The process of claim 3 wherein the alkylene glycol is ethylene glycol.

5. The process of claim 1 wherein the alkylene glycol is esterified with terephthalic acid in amounts ranging from about 1 to 3 moles of alkylene glycol per mole of terephthalic acid.

6. A process for the direct esterification of terephthalic acid with an alkylene glycol which comprises esterifying terephthalic acid with an alkylene glycol containing 2 to about 10 carbon atoms per molecule under direct esterification conditions in the presence of an amount, sufficient to suppress the formation of aliphatic ether groups, of an alkyl urea selected from the group having the general formulas

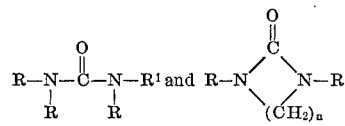

wherein $R^1$ is lower alkyl containing up to about 6 carbon atoms, R is selected from the group consisting of hydrogen and lower alkyl containing up to about 6 carbon atoms and $n$ is an integer of about 2 to 10.

7. The process of claim 6 wherein the alkyl urea is present in the amount of about 0.005 to 1.0 weight percent based upon the weight of the terephthalic acid.

8. The process of claim 7 wherein the alkyl urea is 1-methyl urea.

9. The process of claim 7 wherein the alkyl urea is 1-ethyl urea.

10. The process of claim 7 wherein the alkyl urea is 2-imidazolidinone.

11. The process of claim 6 wherein the direct esterification is conducted at temperatures ranging from about 200 to 300° C. and pressures ranging from atmospheric up to about 300 p.s.i.g.

12. The process of claim 6 wherein the alkylene glycol is ethylene glycol.

13. The process of claim 6 wherein the alkylene glycol is esterified with terephthalic acid in amounts ranging from about 1 to 3 moles of alkylene glycol per mole of terephthalic acid.

References Cited

UNITED STATES PATENTS

| | | | |
|---|---|---|---|
| 3,050,548 | 8/1962 | Munro et al. | 260—475 |
| 3,484,410 | 12/1969 | Lazarus et al. | 260—75 |

LEWIS GOTTS, Primary Examiner

E. J. SKELLY, Assistant Examiner

U.S. Cl. X.R.

260—75R, 75N, 475P